United States Patent
Dellinger et al.

[11] Patent Number: 5,860,690
[45] Date of Patent: Jan. 19, 1999

[54] VISOR AND METHOD OF MANUFACTURING

[75] Inventors: Thomas J. Dellinger, Zeeland; Brian L. Erickson, Holland; Paul T. Vanderkuyl, Holland; Patrick W. Binish, Holland, all of Mich.

[73] Assignee: Prince Corporation, Holland, Mich.

[21] Appl. No.: 976,390

[22] Filed: Nov. 21, 1997

Related U.S. Application Data

[62] Division of Ser. No. 661,819, Jun. 11, 1996, Pat. No. 5,716,092.

[51] Int. Cl.⁶ ........................................... B60J 3/00
[52] U.S. Cl. ............................................... 296/97.1
[58] Field of Search ............................. 296/97.1

[56] References Cited

U.S. PATENT DOCUMENTS

| | | |
|---|---|---|
| 58,696 | 8/1866 | Banks . |
| 159,780 | 8/1875 | Brundage . |
| 1,534,487 | 4/1925 | Banks . |
| 2,057,009 | 10/1936 | Chadwick . |
| 2,236,710 | 4/1941 | Hocking . |
| 2,261,881 | 11/1941 | Horstmann . |
| 2,844,200 | 7/1958 | Herr et al. . |
| 2,901,038 | 8/1959 | Herr et al. . |
| 3,888,613 | 6/1975 | Fries et al. . |
| 4,435,009 | 3/1984 | Foggini . |
| 4,521,046 | 6/1985 | Foggini . |
| 4,558,553 | 12/1985 | Kolk . |
| 4,570,990 | 2/1986 | Flowerday . |
| 4,623,188 | 11/1986 | Juraschek et al. . |
| 4,626,019 | 12/1986 | Tung et al. . |
| 4,744,160 | 5/1988 | Elliott et al. . |
| 4,773,699 | 9/1988 | Cebollero . |
| 4,786,351 | 11/1988 | Elliott et al. . |
| 4,795,517 | 1/1989 | Elliott et al. . |
| 4,923,555 | 5/1990 | Elliott et al. . |
| 4,998,765 | 3/1991 | Van Order et al. . |
| 5,011,211 | 4/1991 | Svensson . |
| 5,011,212 | 4/1991 | Viertel et al. . |
| 5,031,951 | 7/1991 | Binish . |
| 5,087,311 | 2/1992 | Elliott et al. . |
| 5,108,691 | 4/1992 | Elliott . |
| 5,111,579 | 5/1992 | Andersen . |
| 5,131,711 | 7/1992 | Laferle . |
| 5,184,867 | 2/1993 | Prillard .................................. 296/97.1 |
| 5,209,880 | 5/1993 | Miwa . |
| 5,295,725 | 3/1994 | Jones . |
| 5,338,082 | 8/1994 | Miller . |
| 5,374,097 | 12/1994 | George et al. . |
| 5,429,407 | 7/1995 | Buchheit et al. . |
| 5,454,616 | 10/1995 | Aymerich et al. . |

FOREIGN PATENT DOCUMENTS

| | | |
|---|---|---|
| 556724 | 8/1993 | European Pat. Off. . |
| 817597 | 9/1937 | France . |
| 971057 | 1/1951 | France . |
| 1124677 | 10/1956 | France . |
| 3622263 | 1/1988 | Germany . |
| 55-59016 | 5/1980 | Japan . |
| 633398 | 12/1949 | United Kingdom . |
| 864091 | 3/1961 | United Kingdom . |
| 2032368 | 5/1980 | United Kingdom . |
| 2204290 | 11/1988 | United Kingdom . |

*Primary Examiner*—Gary C. Hoge
*Attorney, Agent, or Firm*—Price, Heneveld, Cooper, DeWitt & Litton

[57] ABSTRACT

A visor, according to one embodiment, comprises a closed-cell, semi-rigid urethane foam material thermoformed from sheets into a visor core construction with a reinforced backbone mounted along an edge thereof for mounting the visor to a vehicle. The visor is upholstered utilizing an adhesive and scrim laminate and is formed by heating, pressing and cutting to assure the outer upholstery material adheres smoothly to the visor core and provides a trim edge in appearance. According to another embodiment of the invention, a blend of kenaf fibers are employed as the core material, which is laminated with upholstery material as in the first embodiment to complete the visor construction. In yet another embodiment of the invention, a butterfly-type core construction is made of high density kenaf blend and upholstered in a manner employed for other butterfly visor core constructions.

4 Claims, 4 Drawing Sheets

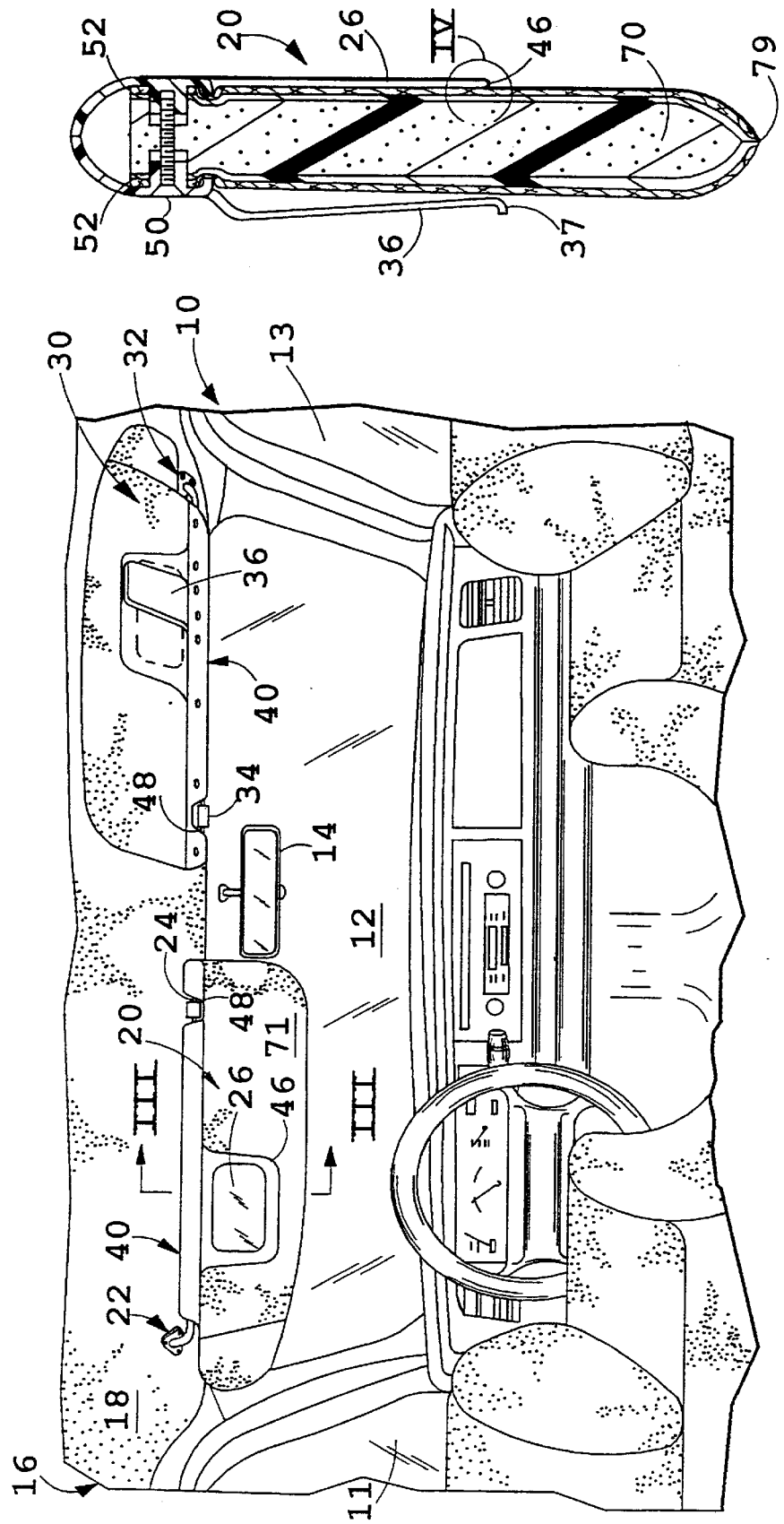

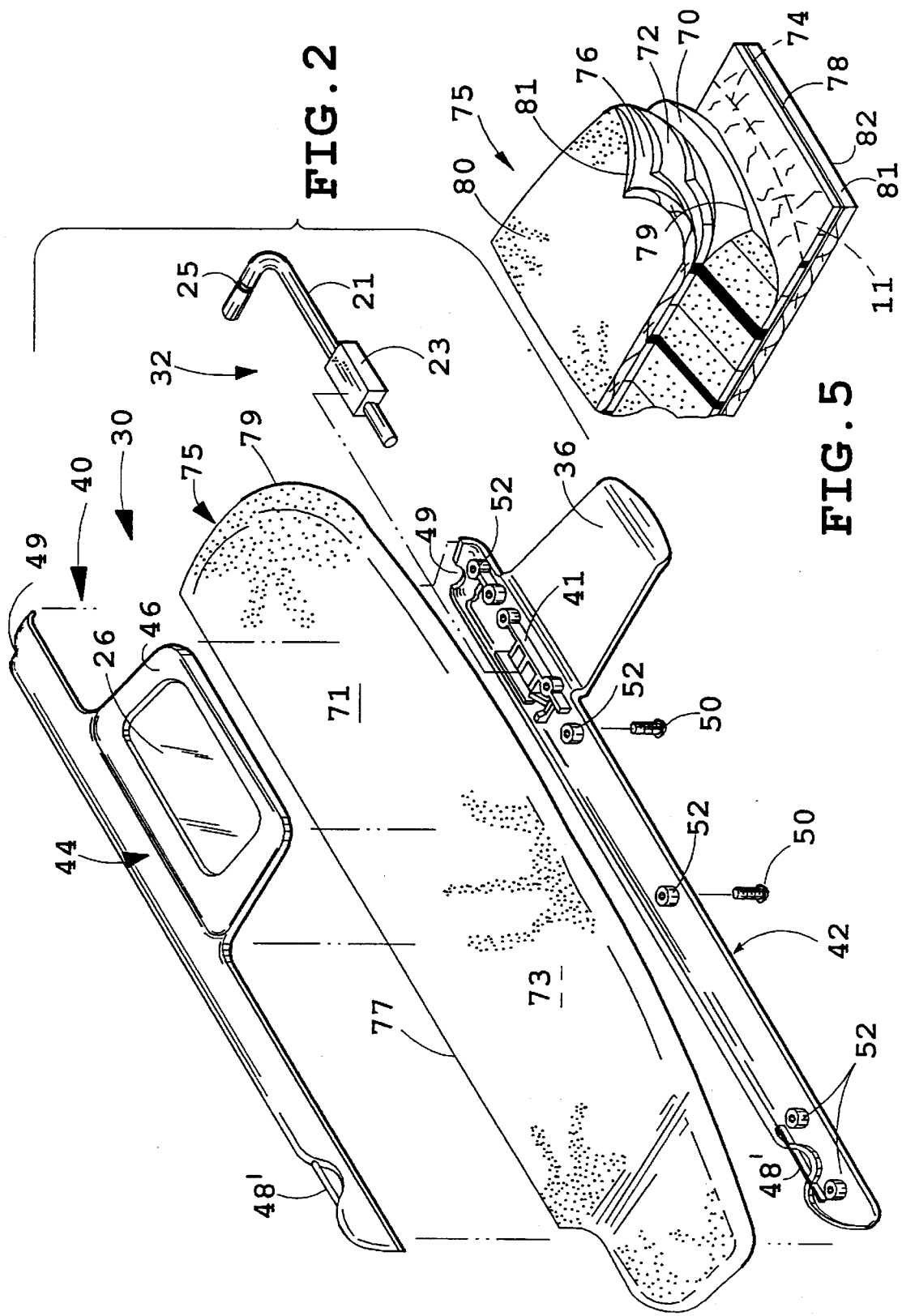

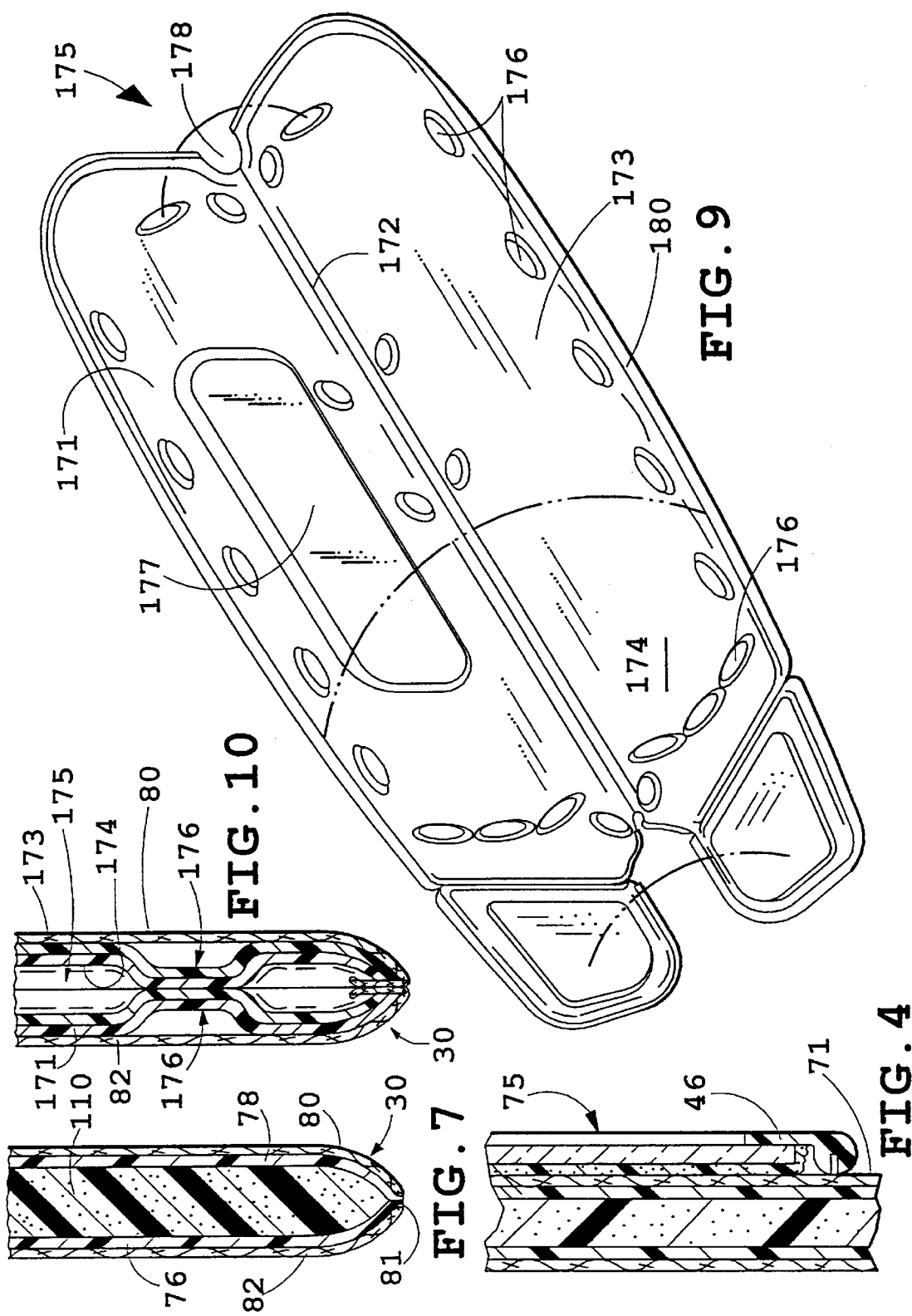

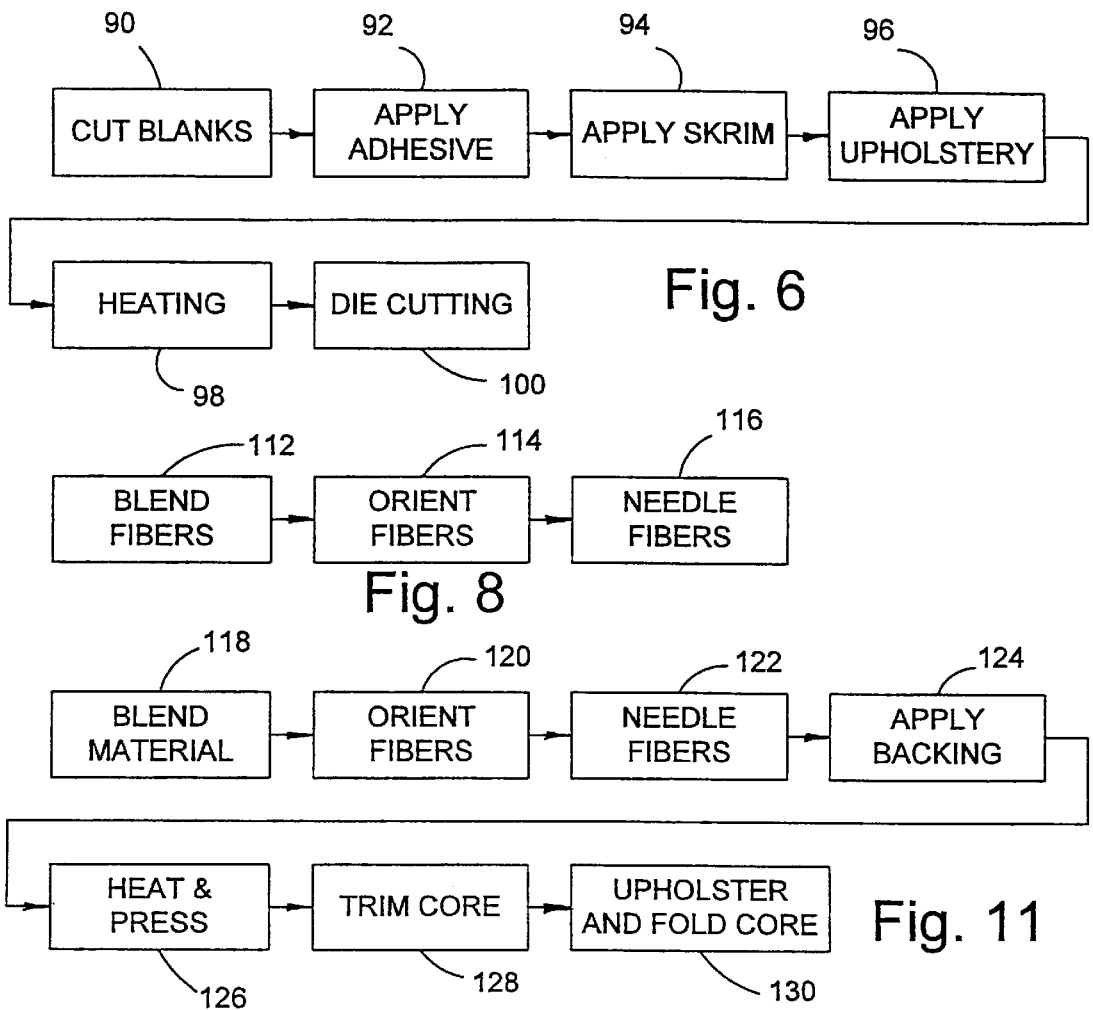

VISOR AND METHOD OF MANUFACTURING

This application is a division of Ser. No. 08/661,819 filed Jun. 11, 1996, now U.S. Pat. No. 5,716,092.

BACKGROUND OF THE INVENTION

The present invention relates to a vehicle visor and particularly to the visor body and mounting construction and its manufacturing method.

Visor bodies have been made utilizing a variety of materials including butterfly-shaped polypropylene cores which are upholstered and folded to complete a visor body, fiberboard cores of similar butterfly shape and foam core construction covered by upholstery. The solid foam core construction is difficult to upholster to obtain a visor configuration with an upholstered appearance that is sufficiently attractive to provide a commercial product. This results since, with a foam core, there are, unlike the butterfly core construction, no edges around which to tuck the upholstery fabric to provide a trim appearance. Further, the dated utilization of an upholstery bead and stitching is both excessively expensive and unattractive in today's modern vehicle interior designs.

In addition, visor cores made of a foam material are difficult to mount to a vehicle inasmuch as the foam material itself is not sufficiently structurally rigid to receive conventional pivot rod torque control and mounting structures. Typically, internal reinforcing members are required for foam core visors. Thus, although foam cores provide a relatively inexpensive and lightweight visor body, there is difficulty both in upholstering the visor in an attractive manner and in mounting such a visor core to the vehicle.

It is also desirable to manufacture visor cores of a recyclable material which is relatively inexpensive and is environmentally friendly. To this end, the present invention contemplates a visor construction which improves upon conventional foam core constructions and in some embodiments utilizes core material other than a polymeric foam.

SUMMARY OF THE PRESENT INVENTION

Visors embodying the present invention, according to one embodiment, comprise a closed-cell, semi-rigid urethane foam material thermoformed from sheets into a visor core construction with a reinforced backbone mounted along an edge thereof for mounting the visor so formed to a vehicle. The visor is upholstered utilizing a laminate of adhesive and upholstery material to assure the outer upholstery material adheres smoothly to the visor core and provides a tear-seal edge which is trim in appearance.

According to one embodiment of the invention, a blend of kenaf and polymeric fibers are employed as the core material, which is laminated with upholstery material to complete the visor construction as in the first embodiment. In yet another embodiment of the invention, a butterfly-type core construction is made of a high density kenaf and polymeric fiber blend and upholstered in a manner employed with other butterfly visor core constructions.

With the visor of the present invention, therefore, a sleek, lightweight visor construction is achieved using either a urethane foam core or recycled material employed in the construction of the visor core to both reduce the visor cost and provide a lightweight attractive visor suitable for today's modern vehicle interior design.

These an other features, objects and advantages of the present invention will become apparent upon reading the following description thereof together with reference to the accompanying drawings.

BRIEF DESCRIPTION OF THE DRAWINGS

FIG. 1 is a fragmentary perspective view of the interior of a vehicle including visors of the present invention;

FIG. 2 is an enlarged exploded perspective view of one of the visors shown in FIG. 1;

FIG. 3 is a vertical cross-sectional view of one of the visors shown in FIG. 1 taken along section lines III—III of FIG. 1;

FIG. 4 is an enlarged view of the encircled area IV in FIG. 3;

FIG. 5 is an enlarged fragmentary partly broken-away view of the laminated structure of the visor shown in FIGS. 1–4;

FIG. 6 is a block diagram of the steps of the method of manufacturing the visor shown in FIGS. 1–5;

FIG. 7 is a fragmentary vertical cross-sectional view of another embodiment of the present invention utilizing an alternate core material;

FIG. 8 is a block diagram of the steps of the method of manufacturing the visor shown in FIG. 7;

FIG. 9 is a perspective view of an alternative embodiment of a visor core manufactured according to an alternative process;

FIG. 10 is an enlarged fragmentary cross-sectional view of a visor employing a core as shown in FIG. 9; and FIG. 11 is a block diagram of the steps of the method of manufacturing the visor shown in FIGS. 9 and 10.

DETAILED DESCRIPTION OF THE PREFERRED EMBODIMENT

Referring initially to FIG. 1, there is shown a vehicle 10, such as an automobile, having a pair of visor assemblies 20 and 30 mounted on the driver and passenger sides, respectively. The visors are mounted above the windshield 12 on opposite sides of the rearview mirror assembly 14 and are mounted to the roof structure 16 covered by an integrally molded headliner 18 having a surface fabric or upholstery which the visors are upholstered to match. The visors are conventionally mounted to the roof 16 of the vehicle utilizing pivot rod assemblies 22 and 32, respectively, which secures one end of each of the visors to the vehicle roof 16. Clips 24 and 34, respectively, mounted above the windshield to the vehicle roof releasably engage visor pins 48 to allow the visors to swing from the front windshield position shown to either the driver side window 11 or the passenger side window 13.

Visors 20 and 30 are substantially identical in construction, although the mounting arrangement is reversed for the driver and passenger sides. Visor 20 is shown in a lowered sun-blocking position for use also of a vanity mirror 26 mounted therein, as described in greater detail below in connection with FIGS. 2–5. Visor 30 is shown in a raised stored position against the vehicle headliner in which a map or other flat item storage clip 36 is shown. Each of the visors 20 and 30 integral include a vanity mirror assembly 26 and a map storage clip 36, which, in turn, are integral with the mounting assemblies 40 for attachment of the pivot rod assemblies 22, 32 to the respective visor. The construction of visor 30 is shown in greater detail now with reference to FIGS. 2–5, it being understood that visor 20 is of identical but mirror image construction.

The body 75 of visor 30 is laminated in a sequential process (as described in connection with FIG. 6 below) of the structure shown in the fragmentary, broken-away cross sections of FIGS. 3–5. Referring initially to FIG. 5, there is shown the core 70 of the visor which is formed from sheets of closed-cell, semi-rigid urethane material having a density of about 2.0 pounds per cubic foot, which is thermoformed together with the remaining structure to form the laminated visor body 75, which is subsequently mounted to the backbone assembly 40 and to the vehicle by the pivot rod assembly 22. The visor body 75, thus, includes a central core 70 bound on either side by layers of hot-melt glue 72 and 74 over which there is placed layers of scrim material 76 and 78. Subsequently, the outer fabric upholstery layers 80 and 82 are placed thereon. During this assembly method, the hot-melt glue sheets 72, 74 melt and extend through the scrim material, bonding the typically foam-backed layers of upholstery material 80, 82 directly to the urethane foam core 70 during the final pressing of the visor body 75 in a visor configuration as seen in FIG. 2.

The core so-formed is employed in the visor 30, which includes a pivot rod assembly 32 having a pivot rod 21 (FIG. 2) which extends into a torque control device 23, shown schematically in FIG. 2, but can be of a construction such as shown in U.S. Pat. No. 4,500,131. The pivot rod assembly 32 also includes a conventional mounting bracket (not shown in FIG. 2) of conventional construction for attaching end 25 of the pivot rod to the vehicle roof, as shown in FIG. 1. The torque fitting 23 nestably fits within a receiving housing 41 formed in one side 42 of the split mounting member 40, which includes a mating side 44. Member 40 is integrally molded of a polymeric material such polycarbonate and includes two generally elongated sides 42 and 44 which are attached to opposite sides 71 and 73, respectively, of visor body 75 over the top edge 77 of the visor body 75.

Slide 44 includes an integrally formed mirror frame 46 for receiving therein a vanity mirror 26. Elongated, relatively thin sides 42 and 44 each include a semicylindrical pin 48' which mate to form the auxiliary mounting pin 48 for brackets 24 and 34, as seen in FIG. 1. Sides 42 and 44 are joined utilizing fastening screws 50 which extend through threaded mounting bosses 52 formed in spaced relationship on the inner surfaces of both sides 42, 44. Screws 50 extend through the visor body 75 and threadably and compressibly secure the sides 42, 44 of the mounting body 40 to each of the visor panels to complete the visor assembly with pivot rod assembly 22 being captively held within housing 41. The end walls of sides 42 and 44 include semicylindrical apertures 49 for allowing the pivot rod 21 to extend outwardly from the interior of the visor assembly so-formed. Like mirror frame 46, which is integral with side 44, the map clip 36 also is integrally formed with side 42. When assembled, as best seen in FIGS. 3 and 4, the mirror frame 46 extends closely adjacent the surface 71 of visor body 75 while the resilient polymeric material forming member 40 and integral clip 36, as best seen in FIG. 3, is mounted to allow some clearance for the storage of maps and the like under the curved tip 37 of the clip so-formed. Fasteners 50 may be self-threading screws employed in connection with polymeric material so that bosses 52 need not be threaded. The upholstered visor body 75 with its trim peripheral edge 79 is formed by the process now described in connection with FIG. 6.

Referring now to FIG. 6, there is shown a method of manufacturing the visor shown in FIGS. 1–5 which includes cutting sheets of semi-rigid urethane foam into rectangular blanks as indicated by step 90. Such blanks are somewhat larger than the overall shape of the visor core 75 when completed. Next, the adhesive material 72 and 74 is applied to opposite sides of the blanks, as indicated by step 92. This can be accomplished by supplying rolls of adhesive converging on opposite sides of the blanks as they progress along an assembly line or by spray-applying the hot-melt glue in liquid form to opposite sides of the urethane blanks. The scrim material 76, 78 is then applied to the outer surfaces of the adhesive as indicated by block 94. The scrim employed is a spun-bonded, non-woven polyester material which has a weight of 0.6 oz/yard$^2$. It adds some external strength to the overall visor body construction and serves as an interface between the foam backed upholstery and the foam core. The upholstery fabric is then applied to the partially formed visor body, typically utilizing rollers from above and below the now web of blanks, adhesive and scrim, as indicated by step 96. This still loose laminate is then heated in an oven as indicated by step 98 to soften the hot-melt glue which permeates the scrim material, which step is followed by the die cutting of the final visor body shape in a 50-ton press utilizing a steel rule blade, knife edge ground, to define the peripheral edge 79 of the visor body 75, as indicated by step 100. The die cutting occurs while the hot-melt glue is molten so that the free edges 81 (FIG. 5) of the upper and lower layers 80, 82 of fabric bond together and form the trim edge 79 of the visor body 75. This process of cutting and pressing is performed while cooling the melted adhesive during a pressing and cutting cycle of approximately 30 seconds under 50 tons of cutting force which is sufficient to provide the trim tear-seal appearance to the peripheral edge 79 and allow the hot-melt adhesive to solidify bonding the upholstery evenly to the planar surface of core 70 through the permeable scrim material 76, 78. The support member 40 is then attached to opposite sides of the visor body 75 utilizing fastening screws 50 after the pivot rod assembly 22 is positioned within housing 41. This completes the assembly of the laminated visor structure of the embodiment shown in FIGS. 1–5. It is noted that the sectional views of FIGS. 3, 4, 7 and 10 show only the core scrim and upholstery since the adhesive melts and blends into the interface of these three layers. In an alternative embodiment, an organic recyclable material is employed for the visor core and is shown in FIG. 7 now described.

The visor shown in FIG. 7 is of the same general construction as that shown in the embodiment of FIGS. 1–5 and manufactured by a process similar to that described in FIG. 6 with, however, a different core material. The visor core 110 of FIG. 7 is made of a blend of organic fibrous material known as kenaf, which is the ground-up stalk fibers of a hibiscus plant. These fibers are blended with polypropylene fibers in a mixture which can range from about 40% kenaf to 60% polypropylene fibers by weight to a mixture of about 60% kenaf and 40% polypropylene fibers. The polypropylene is in a fibrous form, and the kenaf and polypropylene fibers are mixed in a conventional pin cylinder mixer as indicated by block 112 in FIG. 8 and subsequently oriented, as indicated by block 114, and formed into a web using a conventional air-lay machine to initially orient the fibers longitudinally and subsequently by a standard needling machine to entangle the fibers, as shown by block 116 in FIG. 8. The result is an approximately one-inch thick web of somewhat fluffy mat-type material which is then employed in the process shown in FIG. 6 by cutting into blanks and following the same sequences shown in FIG. 6 by which the one-inch mat becomes compressed into a sufficiently rigid form to provide a structurally rigid visor core to which the backbone mount 40 of FIG. 2 is attached to complete the visor assembly 30. Thus, the visor assembly shown in FIG. 7 is made of a relatively inexpensive previously unused material which surprisingly has characteristics which lend itself to the forming of a visor core and is an organically, ecologically acceptable substitute for the foam urethane core material shown in the embodiment of FIGS. 1–5. The polypropylene fibers likewise can be from recycled polypropylene products. The kenaf material can also be used in a butterfly-type core construction, as shown in FIGS. 9–10, utilizing a somewhat different process, as illustrated in part in FIG. 11, which visor construction and manufacturing method is now described in connection with these figures.

In the third embodiment shown in FIGS. 9–11, a butterfly-type visor core 175 is provided and formed with an integral hinge 172 between core halves 171 and 173. Each of the core halves comprise a composite material of a mixture of kenaf as in the second embodiment, together with a blend of polypropylene fibers as in the second embodiment. Alternatively, the core may be a blend of the composite material described in U.S. Pat. No. 5,068,001, the disclosure of which is incorporated herein by reference, with polypropylene fibers in the same range of ratios of about 40–60% to about 60–40% by weight. These raw materials are blended in the same proportions as described in connection with FIG. 2, as indicated by block 118 in FIG. 11, and introduced into a platen heater. Once the kenaf and blend of mating materials have been mixed, the fibrous material is again oriented as indicated by block 120 and needled into a web of material indicated by block 122 similar to that as indicated by block 114 in FIG. 8.

The web from the needling step 122 is then laminated with a trim web of 70% polypropylene and 30% polyethylene tetrafluoride (P.E.T.) on what becomes the inner surface 174 of the visor body by applying such backing material as indicated by block 124. The backing material is subsequently bonded in a heating and pressing step 126 which is achieved in a platen heated press providing 20 tons of pressure to form the rough butterfly outline, which is subsequently trimmed into the final butterfly core shape, as seen in FIG. 9 and indicated by block 128. Upholstery fabric is then applied to the pre-formed core, as indicated by block 130, in any conventional matter, or as taught by U.S. Pat. No. 4,570,990. The addition of the sheet 174 of polypropylene and polyethylene tetrafluoride blend material serves to, when pressed as indicated by block 126, laminate the material to the butterfly core so-formed and serves to subsequently, when the visor is upholstered and the core is upholstered and folded together, form the final visor, bind the visor halves together holding the upholstery in place. For such purpose, a plurality of oval lands 176 (FIGS. 9 and 10) are formed on each of the visor halves 171 and 173 to matingly align such that when the visor core halves are pressed together and heated, the land surfaces bond to mating adjacent surfaces. Prior to this, a pivot rod assembly of conventional design is inserted into end 178 (FIG. 9) of the visor core.

Such construction results in a relatively thin (3/32 of an inch) visor core utilizing, in part, an organically recyclable material which is relatively inexpensive and heretofore not used for such products. Such blend of materials provides sufficient structural rigidity and bonding ability to provide the strength necessary for the visor to accommodate not only a pivot rod assembly but, if desired, an illuminated vanity mirror assembly which can be mounted in a molded-in pocket 177 formed in, for example, side 171 of core 175. It has been discovered that the composite material which is pressed into the butterfly shape has sufficient density and rigidity that it also can be formed with pins around the periphery for holding the upholstery thereto such that the fabric need not be bonded to the butterfly core prior to closing the core halves. Thus, the edge of core 175 can include pins and mating slots such as disclosed in U.S. Pat. No. 4,763,946 around the peripheral edge 180 of the butterfly core to provide an upholstery-holding function as the core halves are folded together and the upholstery held in place by fingers in a conventional manufacturing process while the facing abutting surfaces 176 of the core halves are bonded together.

With each of the laminated form visor bodies of the present invention, therefore, a visor is provided at relatively low cost and provides a light-weight, strong and attractive visor which conforms to modern vehicle appearances. It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A visor comprising:
   a laminated visor body including an inner core of closed-cell polyurethane foam surrounded by a layer of scrim and upholstery material bonded to said core by a layer of adhesive material extending through said scrim; and
   a mounting member extending along an upper edge of said visor body for attaching said visor body to a vehicle.

2. The visor as defined in claim 1 wherein said mounting member includes a pivot rod assembly.

3. The visor as defined in claim 2 wherein said mounting member comprises a pair of elongated members extending on opposite sides of said visor body and coupled together to hold said visor body therebetween.

4. The visor as defined in claim 1 wherein said core is laminated under heat and pressure.

* * * * *